United States Patent
Hong et al.

(10) Patent No.: US 11,210,661 B2
(45) Date of Patent: Dec. 28, 2021

(54) METHOD FOR PROVIDING PAYMENT GATEWAY SERVICE USING UTXO-BASED PROTOCOL AND SERVER USING SAME

(71) Applicant: Coinplug, Inc., Gyeonggi-do (KR)

(72) Inventors: Jay Wu Hong, Seoul (KR); Moon Gju Suh, Seoul (KR)

(73) Assignee: COINPLUG, INC., Gyeonggi (KR)

(*) Notice: Subject to any disclaimer, the term of this patent is extended or adjusted under 35 U.S.C. 154(b) by 11 days.

(21) Appl. No.: 16/508,090

(22) Filed: Jul. 10, 2019

(65) Prior Publication Data
US 2019/0333058 A1    Oct. 31, 2019

Related U.S. Application Data

(63) Continuation of application No. PCT/KR2018/000475, filed on Jan. 10, 2018.

(30) Foreign Application Priority Data

Jan. 11, 2017    (KR) .................. 10-2017-0004421

(51) Int. Cl.
*G06Q 20/38*    (2012.01)
*G06Q 20/02*    (2012.01)
(Continued)

(52) U.S. Cl.
CPC ........ *G06Q 20/3821* (2013.01); *G06Q 20/027* (2013.01); *G06Q 20/3227* (2013.01);
(Continued)

(58) Field of Classification Search
CPC ............. G06Q 20/3821; G06Q 20/027; G06Q 20/3227; G06Q 20/3829; G06Q 20/4012; H04L 9/0637
See application file for complete search history.

(56) References Cited

U.S. PATENT DOCUMENTS 7,050,584 B1 * 5/2006 Hoffmann .............. H04L 9/302
380/262
10,382,213 B1 * 8/2019 Rafn .................... H04L 9/3268
(Continued)

FOREIGN PATENT DOCUMENTS

KR    2014-0089736 A    7/2014
KR    10-1637854 B1    7/2016
(Continued)

OTHER PUBLICATIONS

International Search Report issued in PCT application No. PCT/KR2018/000475, dated Apr. 17, 2018, 4 pp.

*Primary Examiner* — John W Hayes
*Assistant Examiner* — Ari Shahabi
(74) *Attorney, Agent, or Firm* — Xsensus LLP

(57) ABSTRACT

The present disclosure relates to a method for providing a payment agency service and a server using same, and a method for registering an authentication certificate, a method for providing a payment agency service, a card company server, and a payment agency server. The method comprises steps of a payment agency server: (a) delivering identity authentication information and a first push token ID delivered from a user terminal to a card company server; (b) delivering a successful authentication result to the user terminal to support generating and saving a public key and a private key of the user; and (c) managing the first push token ID or a second push token ID as an integrated push token ID when the first push token ID and the second push token ID match, and saving registration information including the integrated push token ID and the public key.

3 Claims, 9 Drawing Sheets

(51) Int. Cl.
*G06Q 20/32* (2012.01)
*G06Q 20/40* (2012.01)
*H04L 9/06* (2006.01)

(52) U.S. Cl.
CPC ..... *G06Q 20/3829* (2013.01); *G06Q 20/4012* (2013.01); *H04L 9/0637* (2013.01)

(56) References Cited

U.S. PATENT DOCUMENTS

2006/0064588 A1* 3/2006 Tidwell ............... H04L 41/5067
    713/169
2016/0283920 A1* 9/2016 Fisher .................... G06Q 20/02
2017/0093835 A1* 3/2017 Whiteside ............ G06F 21/335
2018/0006826 A1* 1/2018 Smith ....................... H04L 9/30
2019/0312877 A1* 10/2019 Zhang ................... H04L 63/102

FOREIGN PATENT DOCUMENTS

| KR | 1637863 | B1 | 7/2016 |
| KR | 1661930 | B1 | 10/2016 |
| KR | 1680260 | B1 | 11/2016 |

\* cited by examiner

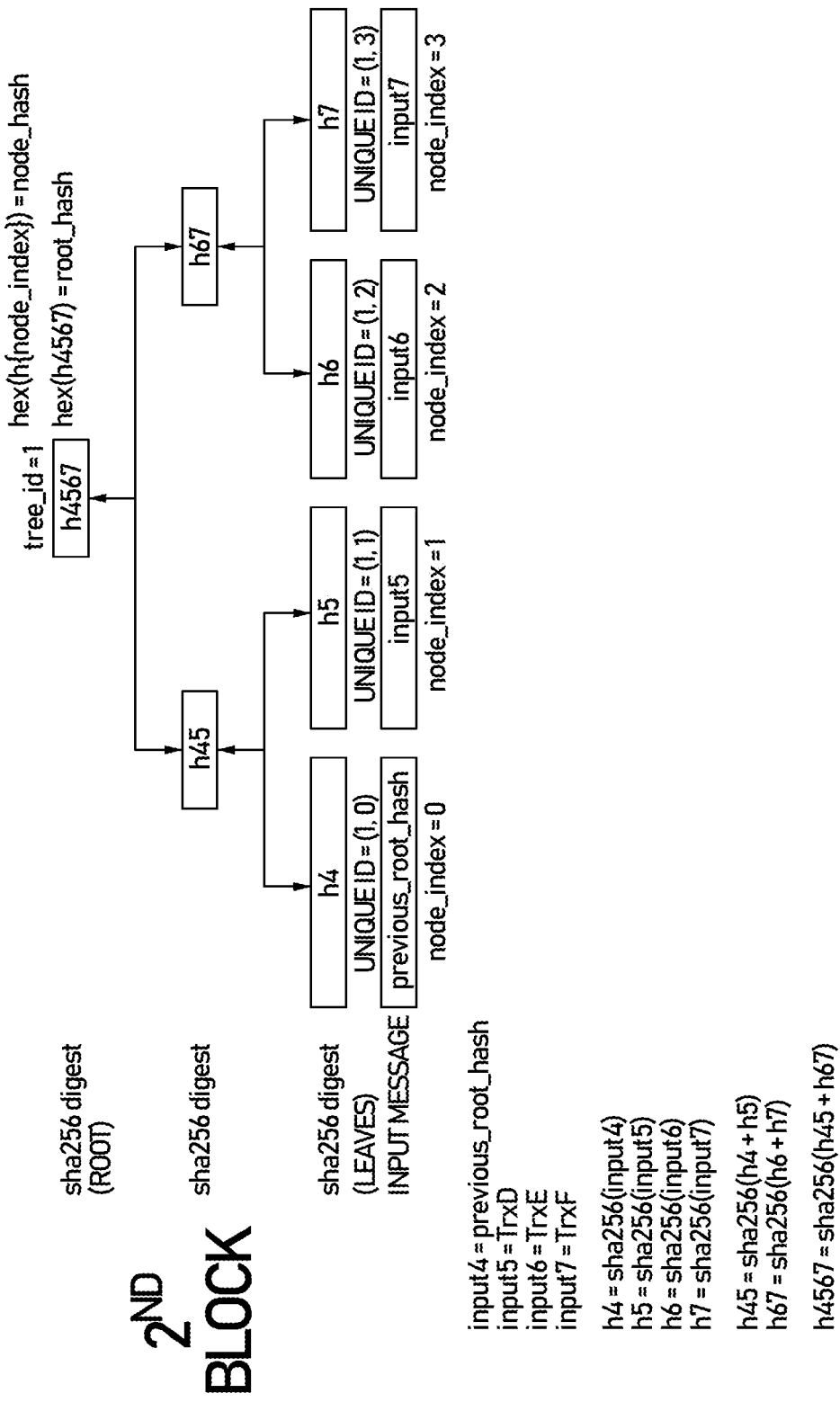

METHOD FOR PROVIDING PAYMENT GATEWAY SERVICE USING UTXO-BASED PROTOCOL AND SERVER USING SAME

FIELD OF THE DISCLOSURE

The present disclosure relates to a method for providing a payment gateway service by using a UTXO (unspent transaction output) based protocol, and more particularly, to the method for registering a certificate to be used for providing the payment gateway service, providing the payment gateway service using the same, and a card service providing server and a payment gateway server using the same.

BACKGROUND OF THE DISCLOSURE

With the increasing number of credit card users at online shopping malls and brick-and-mortar stores, credit cards are becoming an important payment tool together with cash.

Conventionally, a general payment flow using a credit card is as follows.

First, a user makes a purchase request to a sales service provider such as a shopping mall to purchase a specific product or service, and inputs a card number to an online authentication company. Then, the online authentication company requests a card service company to authenticate the card number, and receives an authentication result of the card number from the card service company. If the authentication result is successful, the online authentication company transmits an authentication number to the sales service provider, the shopping mall transmits the encrypted card number and the authentication number to a payment gateway (PG) company, the payment gateway company transmits the encrypted card number and the authentication number to a VAN company, and the VAN company transmits the encrypted card number and the authentication number to the card service company. And an approval result from the card service company is transmitted back to the VAN company, transmitted from the VAN company to the payment gateway company, then transmitted from the payment gateway company to the sales service provider, and a final approval result is received by the user.

Conventionally, such a payment procedure has been a process in which a user authentication and a card authentication are performed separately, and then, a registered payment password and the card number of the credit card of the user are inputted, in order to perform online settlement. This payment procedure of inputting a card number of a credit card has vulnerability of identity forgery due to its online characteristics. In addition, since the payment gateway company and the VAN company store and use the user's card number, there is a drawback that the user is exposed to a high risk of leakage of card information.

Accordingly, in order to maintain a conventional payment system, excessive cost and effort are required to obtain an information security certification, qualified PG companies and PCI-DSS certification qualification, and an abnormal transaction tracking system such as Fraud Detection System (FDS) is also required, however, trained professionals in the field are in shortage.

A settlement flow of simple payment, which is a more evolved step than this general payment procedure, is as follows.

First, when the user makes a purchase request to the sales service provider, the service provider transmits a payment request to the payment gateway company. Then, the payment gateway company sends an authentication-requesting signal to a simple payment app provided to the user's mobile device by the payment gateway company, and the user may input a pre-registered password as a response to the authentication-requesting signal. Then, the card number of the credit card is transmitted from the simple payment app to the payment gateway company, the payment gateway company confirms the authentication of the card number and transmits the encrypted card number to the VAN company, and the VAN company again transmits the card number to the card service company. And an approval result from the card service company is transmitted back to the VAN company, transmitted from the VAN company to the payment gateway company, then transmitted from the payment gateway company to the sales service provider, and a final approval result is received by the user.

Such a simple payment procedure is a service that simplifies complexity and eliminates inconvenience of a conventional payment procedure in an online settlement by merely inputting an app password.

However, such a simple payment procedure is also a process of storing and utilizing the user's card number through the app of the payment gateway company that has obtained a qualification of a qualified PG company, and since the payment gateway company and the VAN company store and use the user's credit card information, there is still a risk of leakage of the card information. As with the disadvantages of the above-mentioned general payment procedure, the simple payment procedure also requires excessive cost and effort to obtain the information security certification, the qualified PG companies and the PCI-DSS certification qualification, and also the abnormal transaction tracking system such as the Fraud Detection system (FDS), however, the trained professionals are also in shortage.

Furthermore, in a situation where there is no dominator of the simple payment procedure in a market, the user must register the card number of the credit card he/she often uses in various simple payment apps. As of December 2016, there are over fifteen of the simple payment apps in Korea, including Naver Pay, Kakao Pay, Syrup Pay, K-Pay, and PayNow, all of which have disadvantage that if those service providers do not have a popular simple payment app, the credit card information must be registered several times for each of the service providers.

SUMMARY OF THE DISCLOSURE

It is an object of the present disclosure to solve all the aforementioned problems.

It is another object of the present disclosure to minimize a risk of exposure of credit card information during a payment flow.

Especially, it is said another object of the present disclosure to protect personal information by preventing the credit card information from being exchanged among entities participating in the payment and at the same time to allow the payment with highly reliable identity authentication.

It is still another object of the present disclosure to allow easy management of information on a credit card payment and improve integrity for preventing errors by storing transactions in a database.

For this purpose, the present disclosure guarantees security and prevents forgery by forcing every entity participating in the credit card payment to use cryptography such as hashing functions, asymmetric cryptography, e.g., RSA and ECC, which is cryptographically effective.

It is still yet another object of the present disclosure to provide methods preventing forgery of transaction information by using a blockchain of a virtual currency as its database, when transactions of registration of certificates and proof of payment are recorded in the database.

In order to accomplish objects above, representative structures of the present disclosure are described as follows.

In accordance with one aspect of the present disclosure, there is provided a method for registering a certificate to be used for providing a payment gateway service by using a database, including steps of: (a) a payment gateway server, if identity authentication information or its processed value, and a 1-st push token ID, which is a unique identifier generated by a user device for providing a push service to the user device, are acquired from the user device, transmitting the identity authentication information or its processed value, and the 1-st push token ID to a card service providing server; (b) the payment gateway server, if an authentication result is acquired from the card service providing server and the authentication result is determined as successful, transmitting the authentication result to the user device, to thereby allow the user device to generate and store a key pair including a public key of a user of the user device and a private key of the user; and (c) the payment gateway server, if a 2-nd push token ID and the public key of the user are acquired from the user device, and if the 1-st push token ID is determined as corresponding to the 2-nd push token ID, managing the 1-st push token ID or the 2-nd push token ID as an integrated push token ID, and storing registration information including the integrated push token ID and the public key.

In accordance with another aspect of the present disclosure, there is provided a method for registering a certificate to be used for providing a payment gateway service by using a database, including steps of: (a) a card service providing server, if identity authentication information or its processed value, and a 1-st push token ID, which is a unique identifier generated by a user device for providing a push service to the user device, are acquired from the user device by way of a payment gateway server, performing a process of transmitting authentication-requesting information including the identity authentication information or its processed value to a ledger server, and a process of storing the 1-st push token ID and device identification information, to be used for identifying the user device, included in the identity authentication information; and (b) the card service providing server, if an authentication result corresponding to the authentication-requesting information is acquired from the ledger server, and if the authentication result is determined as successful, transmitting the authentication result to the payment gateway server.

In accordance with still another aspect of the present disclosure, there is provided a method for providing a payment gateway service by using a database, including steps of: (a) a payment gateway server, if payment-reception request information including payment subject information, sales service provider authentication information, and a hash value of device identification information which is generated by applying a hashing operation to the device identification information to be used for identifying a user device is acquired from a sales service providing server which is a server of a sales service provider in response to a payment request from a user, performing (i) a process of transmitting payment-reception result information, corresponding to the payment-reception request information, which includes (i-1) the hash value of the device identification information and (i-2) an order number included in the payment subject information to the sales service providing server and (ii) a process of transmitting the payment subject information and authentication-requesting information, which is used for requesting authentication of the payment subject information, to the user device, in response to the payment-reception request information; (b) the payment gateway server, if payment-approval request information including a 2-nd push token ID, consented by the user in response to the authentication-requesting information, is acquired, and if the 1-st push token ID included in the authentication-requesting information is determined as corresponding to the 2-nd push token ID, managing the 1-st push token ID or the 2-nd push token ID as an integrated push token ID, and verifying a validity of the payment-approval request information; and (c) the payment gateway server, if the payment-approval request information is determined as valid, allowing a card service providing server to approve a payment according to the payment-approval request information.

In accordance with still yet another aspect of the present disclosure, there is provided a method for providing a payment gateway service by using a database, including steps of: (a) on condition (i) that payment subject information, sales service provider authentication information, and a hash value of device identification information which is generated by applying a hashing operation to the device identification information to be used for identifying a user device have been acquired as payment-reception request information, from a sales service providing server which is a server of a sales service provider, by a payment gateway server in response to an approval request from a user, (ii) that the payment subject information and authentication-requesting information to be used for authentication of the payment subject information have been transmitted to the user device by the payment gateway server, and (iii) that payment-approval request information transmitted to the payment gateway server consented by the user in response to the authentication-requesting information has been determined as valid, a card service providing server acquiring the payment-approval request information from the payment gateway server; and (b) the card service providing server approving a payment by using information on a credit card to be used for approving the payment according to the payment-approval request information.

In accordance with still yet another aspect of the present disclosure, there is provided a payment gateway server for registering a certificate to be used for providing a payment gateway service by using a database, including: a communication part for acquiring identity authentication information or its processed value, and a 1-st push token ID, which is a unique identifier generated by a user device for providing a push service to the user device; and a processor for performing (I) a process of transmitting the identity authentication information or its processed value, and the 1-st push token ID to a card service providing server, (II) a process of, if an authentication result is acquired from the card service providing server and the authentication result is determined as successful, transmitting the authentication result to the user device, to thereby allow the user device to generate and store a key pair including a public key of a user of the user device and a private key of the user, and (III) a process of, if a 2-nd push token ID and the public key of the user are acquired from the user device, and if the 1-st push token ID is determined as corresponding to the 2-nd push token ID, managing the 1-st push token ID or the 2-nd push token ID as an integrated push token ID, and a process of storing registration information including the integrated push token ID and the public key.

In accordance with still yet another aspect of the present disclosure, there is provided a card service providing server for registering a certificate to be used for providing a payment gateway service by using a database, including: a communication part for acquiring identity authentication information or its processed value, and a 1-st push token ID, which is a unique identifier generated by a user device for providing a push service to the user device from the user device by way of a payment gateway server; and a processor for performing (I) a process of transmitting authentication-requesting information including the identity authentication information or its processed value to a ledger server, and a process of storing the 1-st push token ID and device identification information, to be used for identifying the user device, included in the identity authentication information, and (II) a process of, if an authentication result corresponding to the authentication-requesting information is acquired from the ledger server, and if the authentication result is determined as successful, transmitting the authentication result to the payment gateway server.

In accordance with still yet another aspect of the present disclosure, there is provided a payment gateway server for providing a payment gateway service by using a database, including: a communication part for acquiring payment-reception request information including payment subject information, sales service provider authentication information, and a hash value of device identification information, which is generated by applying a hashing operation to the device identification information to be used for identifying a user device, from a sales service providing server which is a server of a sales service provider, in response to a payment request from a user; and a processor for performing (I) (I-1) a process of transmitting payment-reception result information, corresponding to the payment-reception request information, which includes (1) the hash value of the device identification information and (2) an order number included in the payment subject information to the sales service providing server, and (I-2) a process of transmitting the payment subject information and authentication-requesting information, which is used for requesting authentication of the payment subject information, to the user device, in response to the payment-reception request information, (II) a process of, if payment-approval request information including a 2-nd push token ID, consented by the user in response to the authentication-requesting information, is acquired, and if the 1-st push token ID included in the authentication-requesting information is determined as corresponding to the 2-nd push token ID, managing the 1-st push token ID or the 2-nd push token ID as an integrated push token ID, and a process of verifying a validity of the payment-approval request information, and (III) a process of, if the payment-approval request information is determined as valid, allowing a card service providing server to approve a payment according to the payment-approval request information.

In accordance with still yet another aspect of the present disclosure, there is provided a card service providing server for providing a payment gateway service by using a database, including: a communication part for acquiring payment-approval request information from a payment gateway server, on condition (i) that payment subject information, sales service provider authentication information, and a hash value of device identification information, which is generated by applying a hashing operation to the device identification information to be used for identifying a user device have been acquired as payment-reception request information, from a sales service providing server which is a server of a sales service provider, by the payment gateway server in response to an approval request from a user, (ii) that the payment subject information and authentication-requesting information to be used for authentication of the payment subject information have been transmitted to the user device by the payment gateway server, and (iii) that the payment-approval request information transmitted to the payment gateway server consented by the user in response to the authentication-requesting information has been determined as valid; and a processor for approving a payment by using information on a credit card to be used for approving the payment according to the payment-approval request information.

BRIEF DESCRIPTION OF THE DRAWINGS

FIGS. 8 and 9 are drawings schematically illustrating a process of recording a related transaction in a database in accordance with the second and the fourth example embodiments of the present disclosure.

DETAILED DESCRIPTION OF THE PREFERRED EMBODIMENTS

Figure 1:
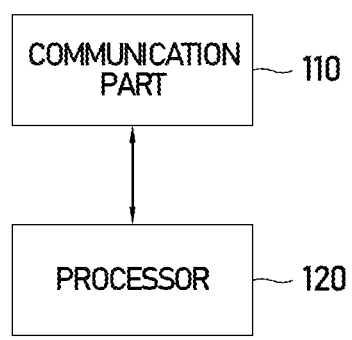
FIG. 1 is a drawing schematically illustrating a server for providing a payment gateway service in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure.

Throughout the present specification, a "database" may be systematic data, i.e., integral sets of managed information and its management system, and may include a general relational database, MongoDB, and a blockchain database, but the scope of the present disclosure is not limited thereto. The present specification describes a blockchain database of a virtual currency for convenience of explanation, but those skilled in the art understand that the scope of the present disclosure is not limited thereto.

In this specification, a "public blockchain database" may indicate every computing device, on a virtual currency system that resides over a public blockchain which is a blockchain used by public as a blockchain, utilized as a database which may be accessed by servers in accordance with the present disclosure.

The virtual currency means digital currency distributed by transactions based on digital wallets of blockchain technology, such as Bitcoin, Litecoin, Darkcoin, Namecoin, Dogecoin, Ripple, etc.

Further, in this specification, a "private blockchain database" indicates a database using an independently configured private blockchain, e.g., the blockchain using the virtual currency, which is managed directly by the servers in accordance with the present disclosure, not the public blockchain.

And a "payment gateway server" in this specification, may be a server operated by a payment gateway company to provide a payment gateway service in accordance with the present disclosure, and a "card service providing server" may be a server operated by a card service company for providing a card payment service in response to the payment gateway service in accordance with the present disclosure.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

In a first example embodiment of the present disclosure, the card service providing server operated by the card service company in a payment procedure in accordance with the present disclosure functions as a major part, and individual transactions are stored in a 1-st database as need be.

In a second example embodiment of the present disclosure, the card service providing server operated by the card service company in the payment procedure in accordance with the present disclosure functions as the major part, and the individual transactions are stored in the 1-st database, and a representative hash value generated from transactions stored in the 1-st database is stored in a 2-nd database. That is, the second example embodiment is configured in a type of an anchoring method which improves an integrity of stored information in double.

In a third example embodiment of the present disclosure, a payment gateway server operated by the payment gateway company in the payment procedure in accordance with the present disclosure functions as the major part, and the individual transactions are stored in the 1-st database as need be.

In a fourth example embodiment of the present disclosure, the payment gateway server operated by the payment gateway company in the payment procedure in accordance with the present disclosure functions as the major part, and the individual transactions are stored in the 1-st database, and the representative hash value generated from the transactions stored in the 1-st database is stored in the 2-nd database. That is, the fourth example embodiment is configured in the type of the anchoring method which improves the integrity of the stored information in double.

For reference, in accordance with the present disclosure, the 1-st database may be a database where data is stored directly, and the 2-nd database may be a database where the data is stored indirectly via the 1-st database for assuring the integrity of the data.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present disclosure to enable those skilled in the art to practice the present disclosure.

FIG. 1 is a drawing schematically illustrating a server for providing the payment gateway service in accordance with one example embodiment of the present disclosure.

By referring to FIG. 1, the payment gateway server and the card service providing server, which may be the server in accordance with the present disclosure, may be a computing device 100 including a communication part 110 and a processor 120 and may communicate directly or indirectly with other computing devices. The payment gateway server may be comprised of multiple computing devices including a payment gateway managing server as described later, and the card service providing server may also be comprised of multiple computing devices including a card service managing server.

Also, entities including a user device and a sales service providing server may be the computing device 100, typically.

Specifically, the server and the user device may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part 110 of such computing devices may transmit requests to and receive responses from other linked devices. As one example, such requests and responses may be carried out by the same TCP session, but they are not limited to these. For example, they could be transmitted and received as UDP datagrams.

Also, the processor 120 of such devices may include hardware configuration of MPU (Micro Processing Unit) or CPU (Central Processing Unit), cache memory, data bus, etc. Additionally, any OS and software configuration of applications that achieve specific purposes may be further included.

First Example Embodiment

A method for providing the payment gateway service in accordance with the first example embodiment of the present disclosure is described as follows.

Figure 2:
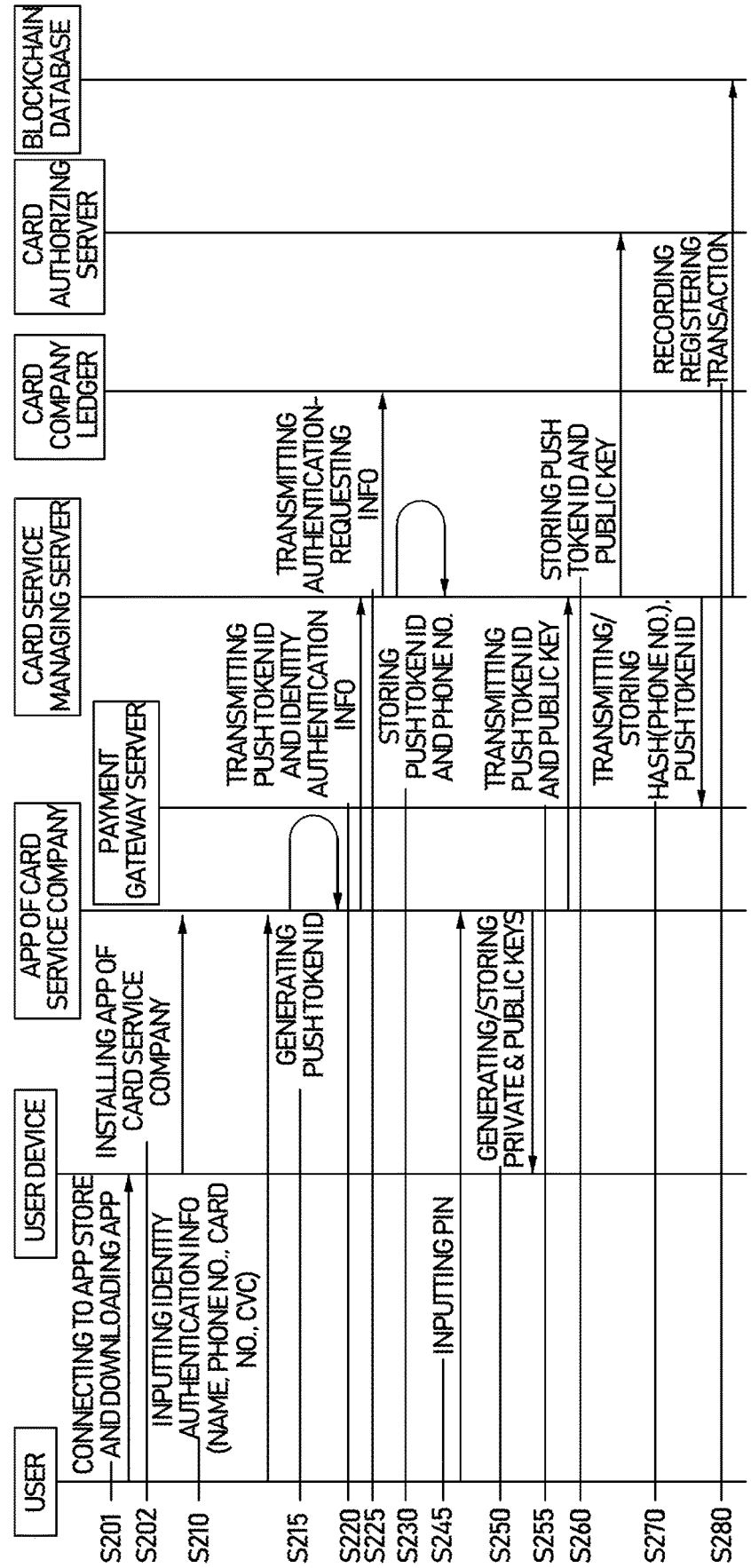
FIG. 2 is a sequence diagram schematically illustrating a method of registering a certificate to be used for the payment gateway service in accordance with a first example embodiment and a second example embodiment of the present disclosure.

FIG. 2 is a sequence diagram schematically illustrating the method of registering a certificate to be used for the payment gateway service in accordance with the present disclosure.

By referring to FIG. 2, the present disclosure may assume that, to acquire an app, i.e., an application, for receiving the payment gateway service in accordance with the present disclosure, the user has completed a step S201 of connecting to an app store and downloading the app and a step S202 of installing the app on the user device, by using the user device.

The card service providing server is described as the card service managing server and a card authorizing server separately in FIG. 2 for convenience of explanation, however, a single card service providing server may perform functions of both the card service managing server and the card authorizing server.

By referring to FIG. 2, the method for registering the certificate to be used for providing the payment gateway service in accordance with the first example embodiment of the present disclosure may include steps as follows: if identity authentication information or its processed value, and a 1-st push token ID, i.e., a PushTokenID which is a unique identifier generated by the user device for providing a push service to the user device, are acquired from the user device at a step S220, the card service providing server allows the user device to generate and store a key pair including a public key and a private key of the user at a step S250.

Herein, the identity authentication information may include at least one of a name of the user, a phone number of the user, a number of a credit card of the user, and a CVC (Card Verification Value) of the credit card of the user, but those skilled in the art understand that the scope of the present disclosure is not limited thereto.

In the first example embodiment, the method in accordance with the present disclosure may include steps as follows: if the identity authentication information or its processed value and the 1-st push token ID are transmitted at the step of S220, the card service providing server transmits authentication-requesting information including the identity authentication information or its processed value to a ledger server at a step S225, the card service providing server stores the 1-st push token ID and device identification information for identifying the user device at a step S230, if an authentication result corresponding to the authentication-requesting information is acquired from the ledger server at a step S235 (not illustrated) and if the authentication result is determined as successful, the card service providing server transmits the authentication result to the user device at a step S240 (not illustrated), and the card service providing server allows the user device to generate and store the key pair, such that the key pair corresponds to a PIN code inputted into the user device at a step S245, at the step S250.

Herein, the push token ID PushTokenID may function as an identifier capable of transmitting, i.e., pushing, data for notifying the user device from outside, and may be generated uniquely for each user device.

Also, the device identification information, which functions similar to the push token ID but is easy to remember and commonly used, may include the phone number of the user corresponding to the user device. However, the device identification information is not limited thereto, and may be any unique identification information corresponding to the user device, and for example, may be an e-mail address corresponding to the user device.

And the PIN code may be information which the user inputs into the user device to prove an identity of the user, and for example, may be a password including alphanumerics and special characters, but the scope of the present disclosure is not limited thereto, and those skilled in the art understand that the PIN code may also be information used in biometrics technology such as FIDO.

By referring to FIG. 2 again, the method for registering the certificate in accordance with the first example embodiment of the present disclosure may further include steps as follows: if a 2-nd push token ID and the public key of the user are acquired at a step S255, and if the 1-st push token ID is determined as corresponding to the 2-nd push token ID, the payment gateway server manages the 1-st push token ID or the 2-nd push token ID as an integrated push token ID, and stores registration information including the integrated push token ID and the public key at steps S260 and S265.

The card service providing server may include the card service managing server and the card authorizing server, in which case, at the steps S255 to S265, if the 2-nd push token ID and the public key of the user are acquired, and if the 1-st push token ID is determined as corresponding to the 2-nd push token ID, the card service managing server may transmit the integrated push token ID and the public key to the card authorizing server, to thereby allow the card authorizing server to retain the integrated push token ID and the public key.

By referring to FIG. 2 again, the method for registering the certificate in accordance with the first example embodiment of the present disclosure may further include steps as follows: if the registration information is stored at a step S265, the card service providing server transmits user identification information including (i) a hash value of the device identification information which is generated by applying a hashing operation to the device identification information to be used for identifying the user device, and (ii) the integrated push token ID to the payment gateway server at a step S270, to thereby allow the payment gateway server to manage the user identification information.

At these steps above, the card service providing server may transmit a message representing completion of registration of the certificate to the user device at a step S275.

Meanwhile, by referring to FIG. 2, the method for registering the certificate in accordance with the first example embodiment of the present disclosure may further include a step as follows: the card service providing server stores or supports another device to store the registration information or its processed value including the integrated push token ID and the public key in the database as a registering transaction of the certificate at a step of S280.

In FIG. 2, the step S280 is shown as being performed after the steps S265 to S275, however, that is just an example, and once the card service providing server retains the registration information, the step S280 may be performed at any time after the steps S255 to S265.

Herein, the database may be a blockchain database, and the blockchain database may be a public blockchain database or a private blockchain database.

Next, the method for providing the payment gateway service in accordance with the first example embodiment of the present disclosure based on the aforementioned certificate is disclosed.

Figure 3:
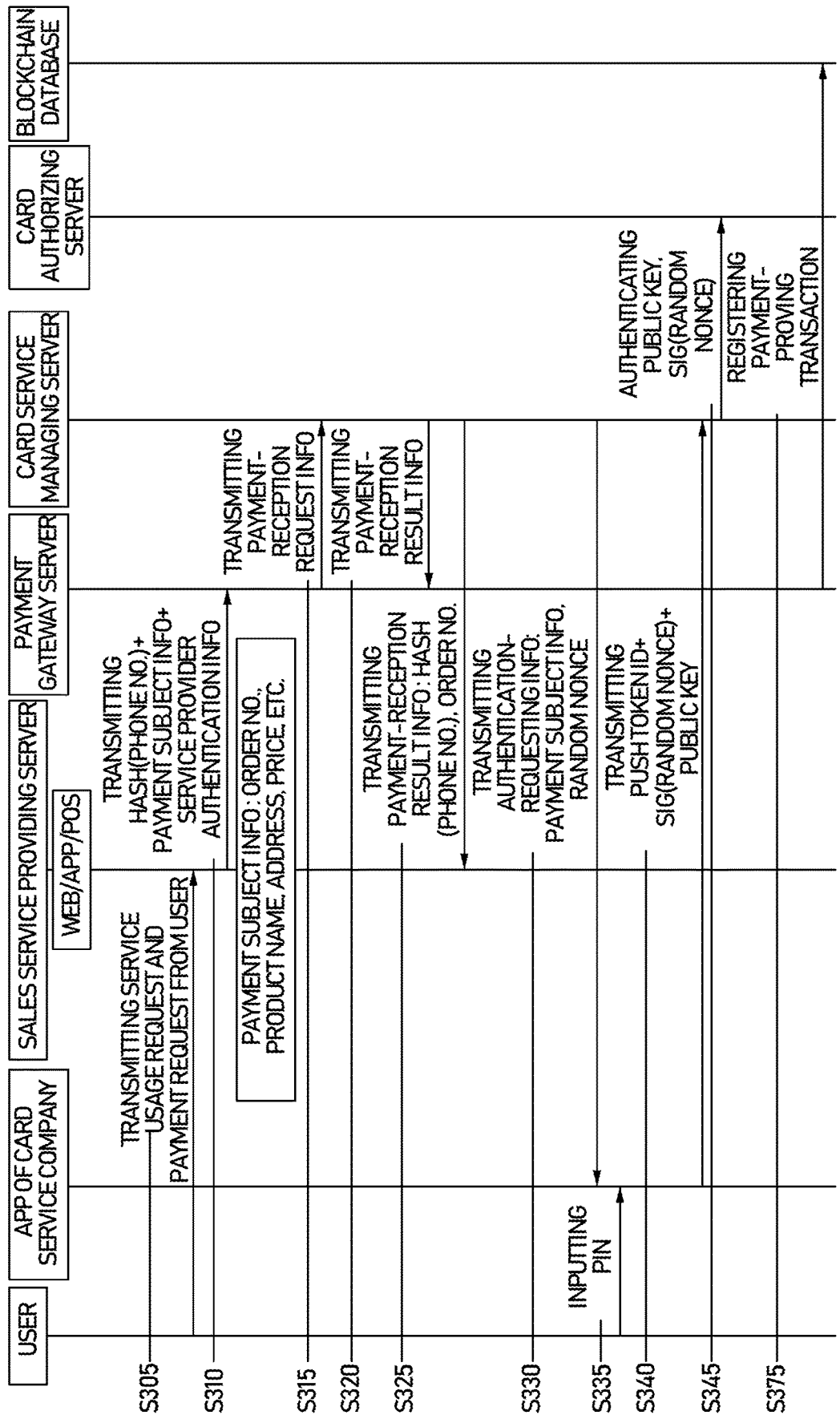
FIG. 3 is a sequence diagram schematically illustrating a method of providing the payment gateway service in accordance with the first example embodiment and the second example embodiment of the present disclosure.

FIG. 3 is a sequence diagram schematically illustrating the method for providing the payment gateway service in accordance with the present disclosure. The card service providing server is described separately as the card service managing server and the card authorizing server in FIG. 3 for convenience of explanation, however, the single card service providing server may perform functions of the card service managing server and the card authorizing server in FIG. 3.

By referring to FIG. 3, the method for providing the payment gateway service in accordance with the first example embodiment of the present disclosure may include steps as follows: in response to a payment request from the user at a step S305, if payment-reception request information including payment subject information and the 1-st push token ID PushTokenID corresponding to the user device is acquired from the payment gateway server at steps S310 and S315, the card service providing server performs processes of (i) transmitting payment-reception result information including a hash value of the device identification information generated by applying the hashing operation to the device identification information to be used for identifying the user device at a step S320, and (ii) transmitting the payment subject information and the authentication-requesting information to be used for requesting authentication of the payment subject information, to the user device, in response to the payment-reception request information, at a step S330.

Herein, the payment request of the user at the step S305 may be first transmitted from the user device to the sales service providing server, and then, related information may be transmitted to the payment gateway server by the sales service providing server, and the transmission may be performed through web pages, apps, and POS devices, but those skilled in the art understand that the scope of the present disclosure is not limited thereto. Examples of the web pages and the apps may correspond to a case of online payment, and examples of the POS devices may correspond to a case of offline payment.

Herein, the payment subject information may include at least part of: an order number, identification information on a card service provider, identification information on the sales service provider, additional information provided by the sales service provider, a name of a payment subject, a price of the payment subject, a payment option in installments, identification information on a currency used for a payment, a name of the user, an address of the user, a date and time of a payment approval, and status information on the payment.

Next, the method for providing the payment gateway service in accordance with the first example embodiment of the present disclosure may further include steps as follows: if payment-approval request information including the 2-nd push token ID, consented by the user at a step S335 in response to the authentication-requesting information, is acquired at a step S340, and if the 1-st push token ID is determined as corresponding to the 2-nd push token ID, the card service providing server manages the 1-st push token ID or the 2-nd push token ID as the integrated push token ID, and verifies a validity of the payment-approval request information at a step S345. For example, the consent by the user may be performed by determining a validity of the PIN code inputted into the user device, where the PIN code may be as described above.

Specifically, the payment-approval according to the payment-approval request information may be one of, for example, a random-nonce using type and a time-stamp using type.

In the random-nonce using type, at the step S330, the card service providing server may transmit the payment subject information and the authentication-requesting information including a random nonce to the user device, and the payment-approval request information may include the 2-nd push token ID, the public key of the user, and a signature value of the random nonce generated by signing the random nonce with the private key of the user, and at the step S345, the card service providing server may verify the validity of the payment-approval request information by using the public key of the user and the signature value of the random nonce.

In this case, a hash value may be acquired from the signature value of the random nonce by further applying the public key of the user to the signature value of the random nonce, and the validity of the signature may be verified by comparing the hash value and a result of applying the hashing function to the random nonce. In the comparison, it is known to those skilled in the art that the signature is valid if the hash value and the result of applying the hashing function are identical and that the signature is invalid if they are not, therefore those skilled in the art may understand how to verify the signature, i.e., an electronic signature.

Meanwhile, in the time-stamp using type, the payment-approval request information may include the 2-nd push token ID, the public key of the user, and a time-stamp signature value generated by signing a time-stamp with the private key of the user, and at the step S345, the card service providing server may verify the validity of the payment-approval request information by using the public key of the user and the time-stamp signature value, and if a time interval between a 1-st point of time corresponding to the time-stamp signature value and a 2-nd point of time when the validity of the payment-approval request information is verified is equal to or greater than a preset value, the payment gateway server may determine that the payment-approval request information is invalid.

Next, by referring to FIG. 3 and FIG. 4 which shows more detailed description of specific steps in FIG. 3, the method for providing the payment gateway service in accordance with the first example embodiment of the present disclosure may further include steps as follows: if the payment-approval request information is determined as valid, the card service providing server, shown in FIG. 4 as including the card service managing server, the card authorizing server, and a card approving server, allows the card service providing server to approve the payment according to the payment-approval request information at steps S351 and S352.

Figure 4:
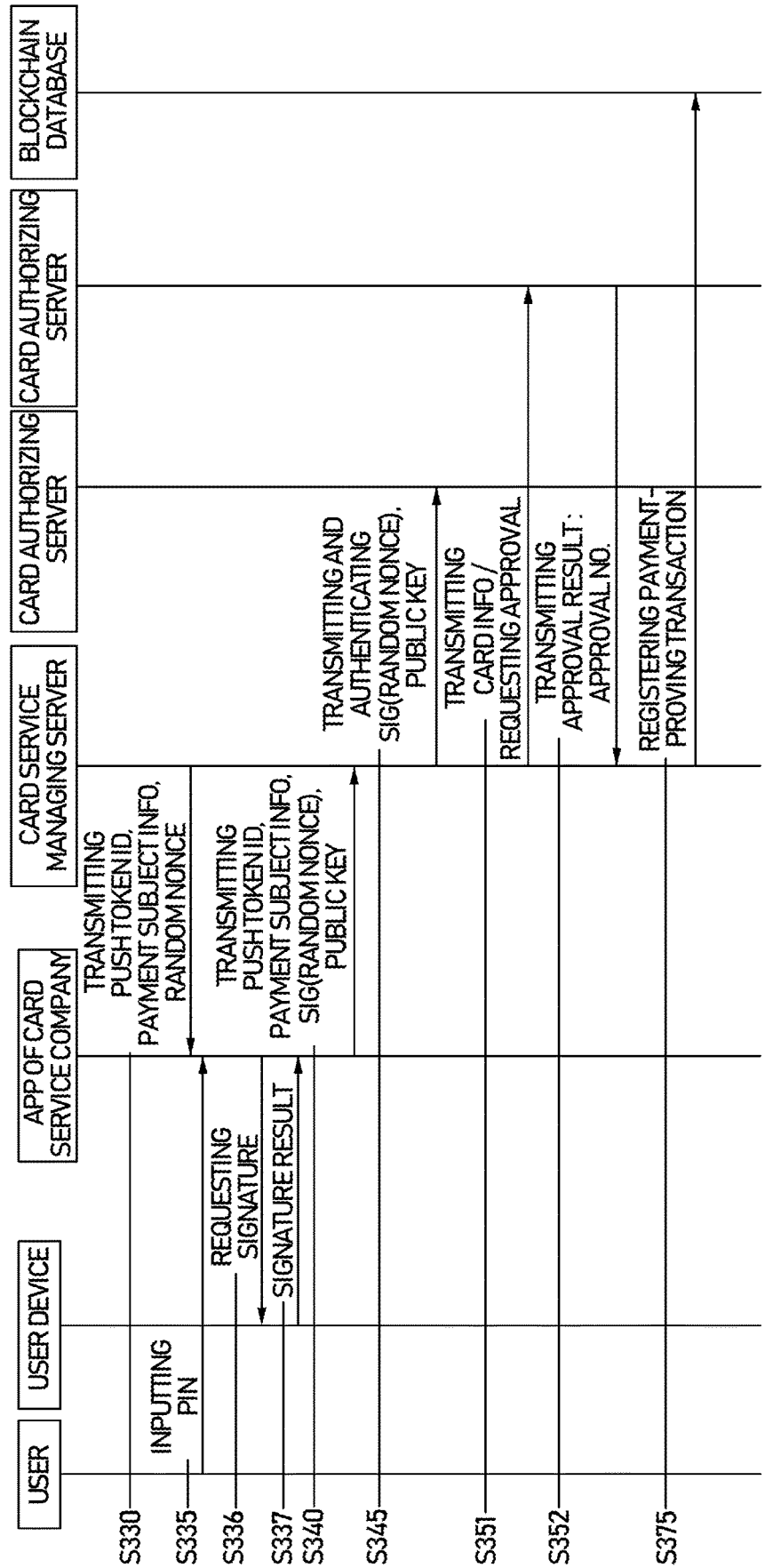
FIG. 4 is a sequence diagram schematically illustrating more detailed description of specific steps of a method illustrated in FIG. 3.

By referring to FIG. 4, in case that the card service providing server is configured as including the card service managing server, the card authorizing server, and the card approving server, and that the authentication-requesting information includes a random nonce, then at the step S330, in response to the payment-reception request information, the card service managing server may transmit the 1-st push token ID, the payment subject information, and the authentication-requesting information to the user device. And in response to the authentication-requesting information, under consent by the user at the step S335, if the payment-approval request information, including a signature value of the random nonce generated by signing the random nonce at steps S336 and S337 with the private key of the user, the 2-nd push token ID, and the public key of the user, is acquired from the user device at the step S340, then the card service managing server may transmit the signature value of the random nonce and the public key to the card authorizing server, to thereby allow the card authorizing server to verify the validity of the payment-approval request information at the step S345. And if the payment-approval request information is determined as valid, the card service managing server may transmit the card information for approving the payment to the card approving server at the step S351 in response to the payment-approval request information, to thereby allow the card approving server to approve the payment at the step S352 by using the card information.

By referring to FIG. 3 again, the method for providing the payment gateway service in accordance with the first example embodiment of the present disclosure may further include steps as follows: if the payment has been approved at the step S352, the card service providing server transmits the payment-approval result representing that the payment has been approved to at least one of the user device and the payment gateway server at steps S355 (not illustrated) and S360 (not illustrated).

As one example, the card service providing server may transmit the payment-approval result to the payment gateway server at the step S360 (not illustrated), to thereby allow the payment gateway server to store a transaction or its processed value including at least part of the hash value of the device identification information, the integrated push token ID, and the payment subject information in the database as a payment-proving transaction, at a step S375.

To describe again the method for providing the payment gateway service from a perspective of the payment gateway server in accordance with the first example embodiment of the present disclosure as aforementioned, the method for providing the payment gateway service may include steps as follows:

First, if the payment subject information, sales service provider authentication information, and the hash value of the device identification information which is generated by applying the hashing operation to the device identification information to be used for identifying the user device are acquired from the sales service providing server which is a server of the sales service provider in response to the payment request from the user, then the payment gateway server performs a step of transmitting the payment-reception request information including the payment subject information and the 1-st push token ID PushTokenID corresponding to the user device to the card service providing server. Second, if the payment-reception result information including the order number in the payment subject information and the hash value of the device identification information is acquired from the card service providing server, the payment gateway server performs a process of transmitting the payment-reception result information to the sales service providing server. And third, if a fact is transmitted from the card service providing server and if the 2-nd push token ID included in the payment-approval request information is determined as corresponding to the 1-st push token ID, where the fact represents that the payment-approval result is successful which is acquired by referring to the payment-approval request information sent from the user device to the card service providing server under the consent of the user, in response to the payment subject information and the authentication-requesting information for requesting authentication of the payment subject information transmitted from the card service providing server to the user device as per the payment-reception request information, then the payment gateway server performs a process of managing the 1-st push token ID or the 2-nd push token ID as the integrated push token ID, and a process of storing or supporting another device to store a transaction or its processed value including at least part of the hash value of the device identification information, the integrated push token ID, and the payment subject information in the database as a payment-proving transaction.

In the method for providing the payment gateway service in accordance with the first example embodiment of the present disclosure, the payment gateway server may transmit the payment-approval result acquired from the card service providing server, in response to the payment-approval request information acquired according to the user's approval, to at least one of the sales service providing server and the user device.

Second Example Embodiment

Next, the second example embodiment of the method for providing the payment gateway service in accordance with the present disclosure is disclosed. Below, the technological characteristics identical to those of the aforementioned first example embodiment will be omitted, and only specific details will be disclosed. A 1-st database of the second example embodiment may correspond to the database of the first example embodiment, and the second example embodiment further describes connection of the 1-st database with a 2-nd database.

By referring to FIG. 2, the method for registering the certificate to be used for providing the payment gateway service in accordance with the second example embodiment of the present disclosure may further include a step, not illustrated, of the card service providing server, if an anchoring condition is satisfied after the step S280 described in the first example embodiment, storing or supporting another device to store a representative hash value or its processed value in the 2-nd database, and acquiring a transaction ID representing a location of the representative hash value or its processed value in the 2-nd database, where the representative hash value or its processed value is generated by hashing calculation using both a specific hash value, which is a hash value of the registering transaction, and its corresponding at least one neighboring hash value which is (i) a hash value of a specific registering transaction which is specific registration information or its processed value including a specific push token ID and a public key of a specific user, or (ii) a hash value of a specific payment-proving transaction which is transaction information or its processed value including at least part of a specific hash value of the device identification information, the specific push token ID, and specific payment subject information.

Herein, the anchoring condition may be one of (i) a condition that a certain number of the specific hash value and the neighboring hash value are acquired or generated, (ii) a condition that a certain amount of time is elapsed, (iii) a condition that a block is created in the 1-st database, and (iv) a condition that has at least one of characteristics of services.

The calculation by using both the specific hash value and at least one of the neighboring hash values may be performed by various functions. Supposing that the specific hash value is an input, and that the neighboring hash values are x1, x2, ..., xn, then a representative hash value t may be expressed as a following formula.

$$t = \text{hash}(\text{function}(\text{input}, x_1, x_2, \ldots, x_n)) \qquad \text{<Formula 1>}$$

Herein, the card service providing server may record and manage the specific hash value and at least one of the neighboring hash values in a certain data structure. Herein, the data structure may vary and one example may be a Merkle tree. In this case, the calculation using both (i) the specific hash value and (ii) at least one hash value of at least one neighboring node which corresponds to a node of the specific hash value may be performed by using the Merkle tree.

That is, the card service providing server may perform or support another device to perform (i) a process of creating at least one Merkle tree by allotting the specific hash value to its leaf node, and (ii) a process of registering, if the anchoring condition is satisfied, the representative hash value or its processed value calculated by using both (ii-1) the specific hash value of a specific leaf node and (ii-2) at least one hash value allocated to at least one of other leaf nodes corresponding to the specific leaf node, in the 2-nd database.

The card service providing server may record or support another device to record the hash value allocated to the root node as the representative hash value in the 2-nd database. Herein, a processed value of the representative hash value may be recorded. For example, a resultant value from hex operation on the representative hash value may be recorded.

Meanwhile, a first data structure and a second data structure may be connected in a form of a chain if the card service providing server stores the specific hash value and the at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created.

Further, if the Merkle tree is a first tree among two or more Merkle trees linked in chains, a hash value or its processed value of a message data, which includes text, numbers or symbols, may be allocated to a first leaf node of the Merkle tree. For example, at the time of creation of the Merkle tree, a hash value of an input message initially given by the card service providing server may be allocated.

Figure 8:

FIGS. 8 and 9 are drawings illustrating an example of a Merkle tree created in accordance with the present disclosure.

FIG. 8 illustrates a Merkle tree with four ($2^2$) leaf nodes. As the illustrated Merkle tree is a first Merkle tree whose tree_id is zero, a hash value SHA256(PrivBC_unique_message) of PrivBC_unique_message is allocated to an h1 node which is a first leaf node. If transactions are being recorded, the card service providing server may create a leaf node next to a last leaf node of the Merkle tree currently being generated, and may allocate or support another device to allocate the specific hash value or its processed value to said next leaf node. For example, if an allocation of values is completed with the h1 node as a last which is a second leaf node of the Merkle tree in FIG. 8, and if a new leaf node is to be created, then an h2 node, which is a next leaf node, may be created and the specific hash value or its processed value (sha256(input2)) may be allocated to the h2 node. Further, the card service providing server may calculate by using both (i) the specific hash value and (ii) a hash value allocated to an h3 node which is a sibling node of the h2 node which is a third leaf node to which the specific hash value is allocated. The hash value of the calculated value above may be allocated to an h23 node which is a parent node of the h2 node and the h3 node. Since the parent node, i.e., the h23 node, is not the root node of the Merkle tree, the card service providing server may repeat the processes by regarding the hash value allocated to the h23 node as the specific hash value. In other words, with the hash value allocated to the h23 node as a specific hash value, the hash values allocated to the h23 node and an h01 node may be used together to be calculated and allocated to an h0123 node which is a parent node of the h23 node and the h01 node. Herein, since the h0123 node is the root node, the card service providing server may record or support another device to record the processed value hex(h{node_index}) of the hash value allocated to the h0123 node in the 2-nd database.

To explain this in a recursive way, if the anchoring condition is satisfied, the card service providing server may (x1) calculate or support another device to calculate an intermediate value by using both (i) the specific hash value and (ii) a hash value allocated to a sibling node of the specific leaf node, and then allocate or support another device to allocate a hash value of the intermediate value to a parent node of the specific leaf node, (x2) record or support another device to record the hash value of the intermediate value in the 2-nd database as the representative hash value if the parent node is a root node of the Merkle tree, and (x3) repeat steps from (x1) to (x3) by regarding the hash value of the intermediate value as the specific hash value and regarding the parent node as the specific leaf node if the parent node is not the root node.

In the second example embodiment, the hash values including (i) the hash value of the specific registering transaction which is the specific registration information or its processed value including the specific push token ID and the public key of the specific user, or (ii) the hash value of the specific payment-proving transaction which is the transaction information or its processed value including at least part of the specific hash value of the device identification information, the specific push token ID, and the specific payment subject information are acquired as many as the number of the leaf nodes, then each of the hash values may be each input value, i.e., each value allocated to each of the leaf nodes, to the aforementioned Merkle tree.

Also, the card service providing server may create a root value of the Merkle tree aforementioned at stated intervals, by referring to the anchoring condition (ii) above. In this case, the card service providing server, if a certain amount of time is elapsed, may create the Merkle tree by referring to input values by the time, and may record or support another device to record the root value of the Merkle tree in the 2-nd database.

However, in this case, no value may be allocated to a sibling node of the node to which the specific hash value is allocated even though the certain amount of time is elapsed. In case no hash value is allocated to the sibling node even though the anchoring condition is satisfied, the card service providing server may allocate or support another device to allocate a certain hash value to the sibling node to thereby produce a root value of the Merkle tree by the method aforementioned. For example, the card service providing server may copy the specific hash value and allocate or support other device to allocate the specific hash value to the sibling node.

The characteristics of services may be at least part of information on cost paid by entities who use the payment gateway service, information on a time-zone during which recording of the transaction is performed, information on a location where the recording of the transaction is performed and information on a type of a company which is a managing entity of a server involved in the recording. However, the scope of the present disclosure is not limited thereto.

Meanwhile, if a creation of a new Merkle tree starts and if the anchoring condition is satisfied with no transaction having been received, the card service providing server may create or support another device to create the new Merkle tree by allotting certain message data to its first and second leaf nodes and may record or support another device to record the root value of the new Merkle tree or its processed value in the 2-nd database. In this case, the new Merkle tree with two leaf nodes may be created.

Meanwhile, the first data structure and the second data structure may be connected in a form of a chain if the card service providing server, as aforementioned, stores the specific hash value and the at least one neighboring hash value in the first data structure and then stores and manages the second data structure identical in a form to the first data structure. Especially, if the first data structure and the second data structure are Merkle trees, a root value of the first data structure or a hash value of the root value may be allocated to a first leaf node of the second data structure.

FIG. 9 is a drawing illustrating an example of a Merkle tree created in a form of the second data structure in accordance with the present disclosure.

By referring to FIG. 9, it is clear that the root value hex(h0123) of the Merkle tree whose tree_id is zero in FIG. 8 is allocated to the first leaf node which is an h4 node of a new Merkle tree. In such a manner, the present disclosure has advantage of improving data integrity, as tracking becomes easier even in a case of data forgery, by connecting multiple data structures created when a transaction occurs.

Also, the method for registering the certificate in accordance with the second example embodiment of the present disclosure may further include a step, not illustrated, of the card service providing server verifying integrity of the 1-st database by periodically comparing (i) a first representative hash value or its processed value calculated by using both (i-1) a hash value of at least one of the registering transaction recorded in the 1-st database and (i-2) its corresponding at least one neighboring hash value and (ii) its corresponding second representative hash value or its processed value recorded in the 2-nd database.

As one example, the 1-st database and the 2-nd database may be blockchain databases. Herein, the 1-st database may be a private blockchain database and the 2-nd database may be a public blockchain database.

However, the scope of the present disclosure is not limited thereto, and those skilled in the art will understand that the 1-st database may be a private blockchain database or a public blockchain database, and that in the same manner, the 2-nd database may be a private blockchain database or a public blockchain database.

Next, the method for providing the payment gateway service in accordance with the second example embodiment of the present disclosure is explained, but the technological characteristics identical to those of the aforementioned first example embodiment will be omitted, and only specific details will be disclosed.

By referring to FIG. 3, the method for providing the payment gateway service in accordance with the second example embodiment of the present disclosure may further include a step, not illustrated, of the card service providing server, if the anchoring condition is satisfied after the aforementioned step, not illustrated, instructing the payment gateway server to store a representative hash value or its processed value in the 2-nd database, and acquiring a transaction ID representing a location of the representative hash value or its processed value in the 2-nd database, where the representative hash value or its processed value is generated by the hashing calculation using both a specific hash value, which is a hash value of the payment-proving transaction, and its corresponding at least one neighboring hash value which is (i) a hash value of the specific registering transaction which is specific registration information or its processed value including the specific push token ID and the public key of the specific user, or (ii) a hash value of the specific payment-proving transaction which is transaction information or its processed value including at least part of the specific hash value of the device identification information, the specific push token ID, and the specific payment subject information, and this is same as the processes described in the method for registering the certificate. Also, processes of creating the representative hash value from the specific hash value and recording it in the 2-nd database are similar to the processes aforementioned, and thus omitted.

Also, the method for providing the payment gateway service in accordance with the second example embodiment of the present disclosure may further include a step, not illustrated, of the card service providing server verifying an integrity of the 1-st database by periodically comparing (i) a first representative hash value or its processed value calculated by using both (i-1) a hash value of at least one of the payment-proving transaction recorded in the 1-st database and (i-2) its corresponding at least one neighboring hash value and (ii) its corresponding second representative hash value or its processed value recorded in the 2-nd database.

Third Example Embodiment

Next, the third example embodiment of the method for providing the payment gateway service in accordance with the present disclosure is disclosed. Below, the technological characteristics identical to those of the aforementioned first and second example embodiments will be omitted, and only specific details will be disclosed. Unlike the second and the fourth example embodiments, the third example embodiment does not disclose a technical characteristic, e.g., a technical characteristic of using a Merkle tree, of calculating a representative hash value further utilizing a neighboring hash value as in the first example embodiment.

Figure 5:
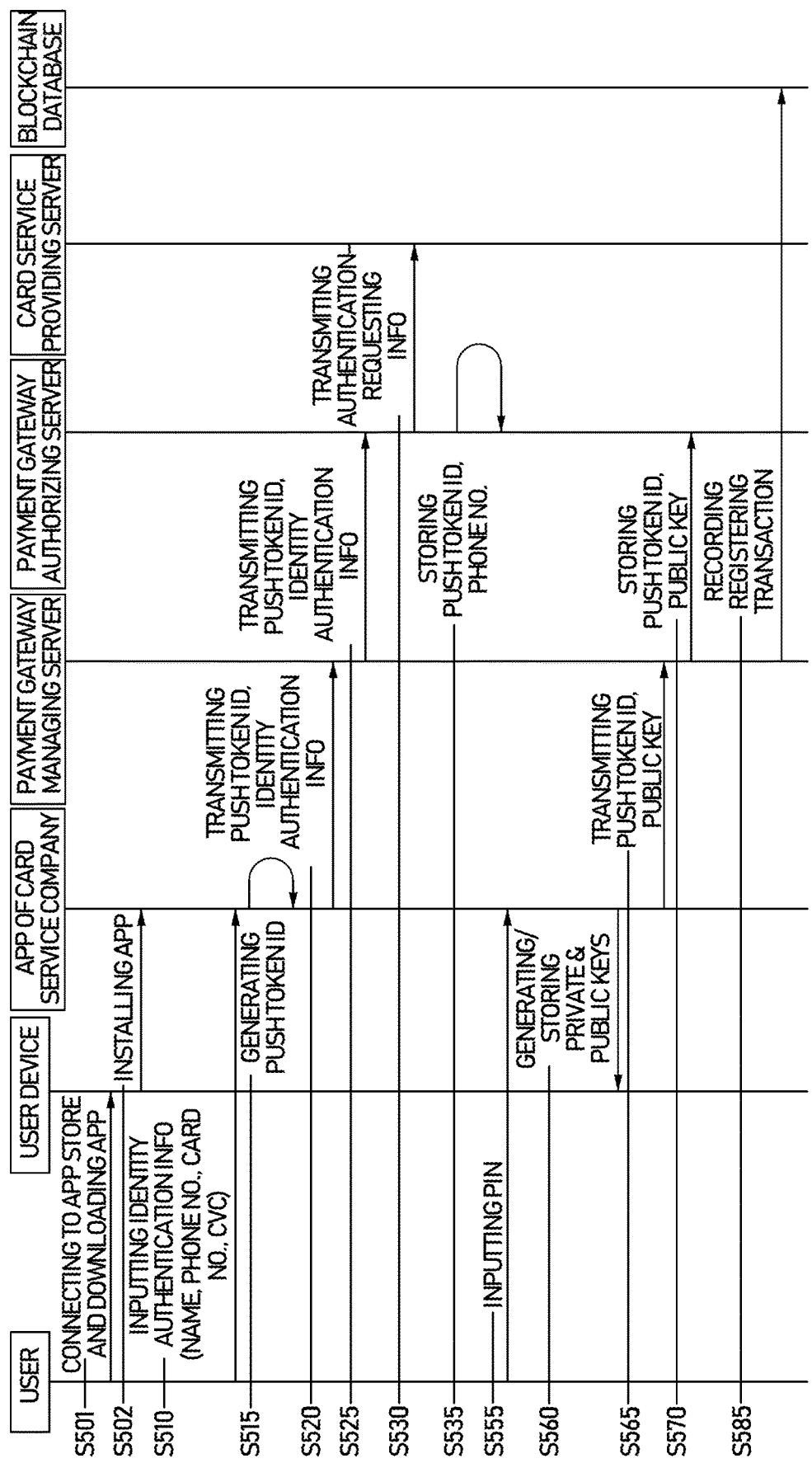
FIG. 5 is a sequence diagram schematically illustrating a method of registering the certificate to be used for the payment gateway service in accordance with a third example embodiment and a fourth example embodiment of the present disclosure.

FIG. 5 is a sequence diagram schematically illustrating the method for registering the certificate to be used for the payment gateway service in accordance with the present disclosure.

By referring to FIG. 5, the present disclosure may assume that, to acquire the app, i.e., an application, for receiving the payment gateway service in accordance with the present disclosure, the user has completed a step S501 of connecting to the app store and downloading the app and a step S502 of installing the app on the user device, by using the user device.

The payment gateway server is described separately as the payment gateway managing server and the payment gateway authorizing server in FIG. 5 for convenience of explanation, however, the single payment gateway server may perform functions of the payment gateway managing server and the payment gateway authorizing server in FIG. 5.

By referring to FIG. 5, the method for registering the certificate to be used for providing the payment gateway service in accordance with the third example embodiment of the present disclosure may include steps as follows: if identity authentication information or its processed value, and the 1-st push token ID, i.e., a PushTokenID which is a unique identifier generated at a step S515 by the user device for providing the push service to the user device, are acquired from the user device at a step S520, the payment gateway server transmits the identity authentication information or its processed value and the 1-st push token ID to the card service providing server at a step S525.

Next, the method for registering the certificate in accordance with the third example embodiment of the present disclosure may further include steps as follows: if an authentication result is acquired from the card service providing server and the authentication result is determined as successful at a step S545 (not illustrated), the payment gateway server transmits the authentication result to the user device at a step S550, to thereby allow the user device to generate and store the key pair including the public key of the user of the user device and the private key of the user, at a step S560.

Herein, the key pair may be generated and stored such that the key pair corresponds to the PIN code inputted into the user device.

By referring to FIG. 5 again, the method for registering the certificate in accordance with the third example embodiment may further include steps as follows: if the 2-nd push token ID and the public key of the user are acquired from the user device at a step S565, and if the 1-st push token ID is determined as corresponding to the 2-nd push token ID, the payment gateway server manages the 1-st push token ID or the 2-nd push token ID as the integrated push token ID, and stores registration information including the integrated push token ID and the public key of the user at a step S570.

Herein, the payment gateway server may transmit a message representing completion of registration of the certificate to the user device.

If the payment gateway server is configured as including the payment gateway managing server and the payment gateway authorizing server, if the 2-nd push token ID and the public key of the user are acquired from the user device, and if the 1-st push token ID is determined as corresponding to the 2-nd push token ID, the payment gateway managing server may transmit the integrated push token ID and the public key of the user to the payment gateway authorizing server at the step S570, to thereby allow the payment gateway authorizing server to retain the integrated push token ID and the public key of the user at a step S575 (not illustrated).

Next, the method for registering the certificate in accordance with the third example embodiment may further include a step as follows: the payment gateway server stores or supports another device to store the registration information or its processed value in the database as a registering transaction of the certificate at a step S585.

In FIG. 5, the step S585 is shown as being performed after the step S565, however, that is just an example, and once the payment gateway server retains the registration information, the step S585 may be performed at any time after the steps S545 (not illustrated) to S560.

Meanwhile, to describe again the method for providing the payment gateway service from a perspective of the card service providing server in accordance with the third example embodiment of the present disclosure, as aforementioned, may include a step of the card service providing server, if the identity authentication information or its processed value, and the 1-st push token ID, which is a unique identifier generated by the user device for providing the push service to the user device, are acquired from the user device by way of the payment gateway server, performing a process of transmitting the authentication-requesting information including the identity authentication information or its processed value to the ledger server, and a process of storing the 1-st push token ID and the device identification information, to be used for identifying the user device, included in the identity authentication information, and may include a step of the card service providing server, if the authentication result corresponding to the authentication-requesting information is acquired from the ledger server, and if the authentication result is determined as successful, transmitting the authentication result to the payment gateway server.

Next, the method for providing the payment gateway service in accordance with the third example embodiment of the present disclosure based on the aforementioned certificate is disclosed.

Figure 6:
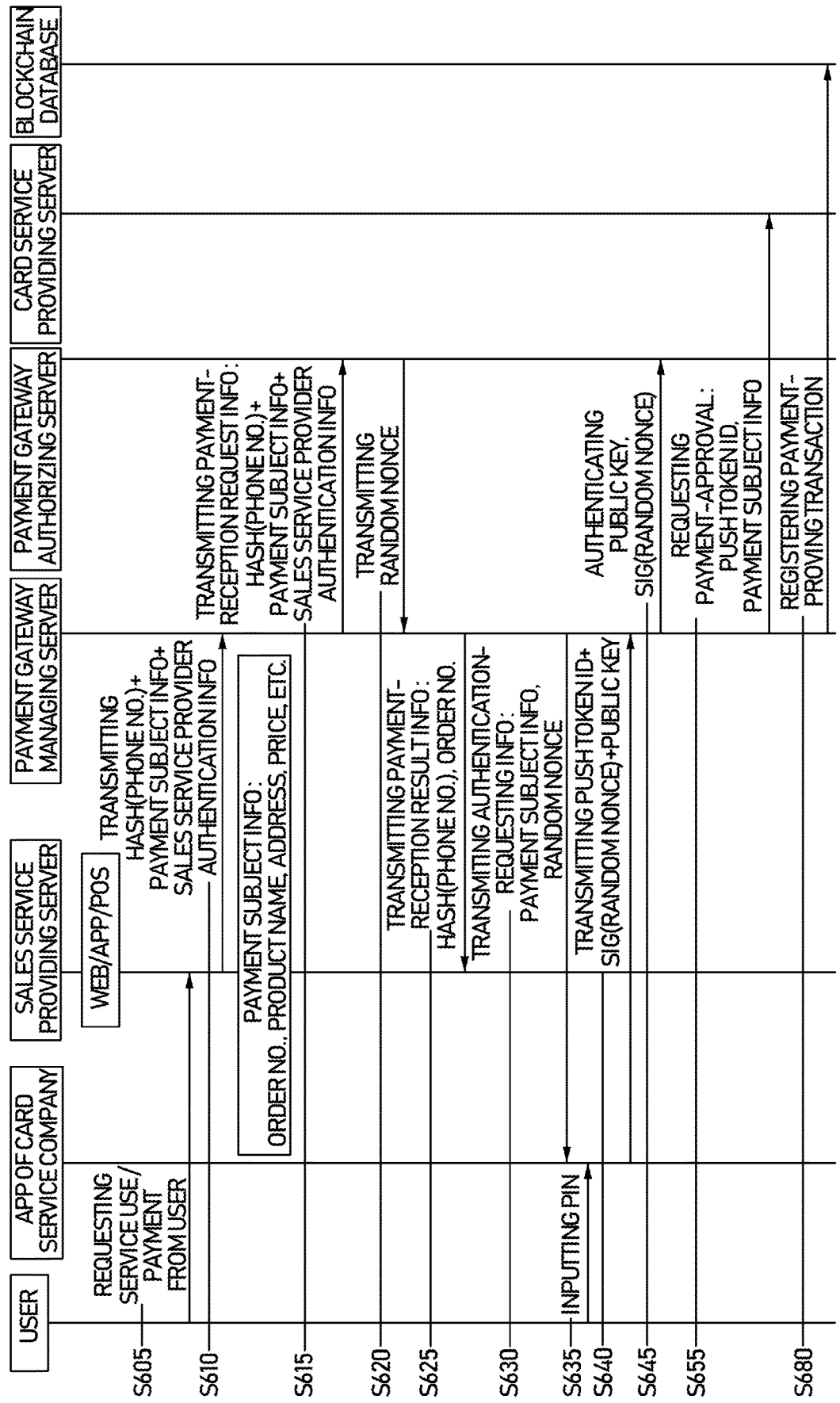
FIG. 6 is a sequence diagram schematically illustrating a method of providing the payment gateway service in accordance with the third example embodiment and the fourth example embodiment of the present disclosure.

FIG. 6 is a sequence diagram schematically illustrating the method for providing the payment gateway service in accordance with the present disclosure. The payment gateway server is described separately as the payment gateway managing server and the payment gateway authorizing server in FIG. 6 for convenience of explanation, however, the single payment gateway server may perform functions of the payment gateway managing server and the payment gateway authorizing server in FIG. 6.

By referring to FIG. 6, the method for providing the payment gateway service in accordance with the third example embodiment of the present disclosure may include steps as follows: in response to the payment request from the user at a step S605, the payment gateway server, if the payment-reception request information including the payment subject information, the sales service provider authentication information, and a hash value of the device identification information which is generated by applying the hashing operation to the device identification information to be used for identifying the user device is acquired from the sales service providing server which is a server of the sales service provider at a step S610, performs processes of (i) transmitting the payment-reception result information, corresponding to the payment-reception request information, which includes (i-1) the hash value of the device identification information and (i-2) the order number included in the payment subject information to the sales service providing server at a step S625 and (ii) transmitting the payment subject information and the authentication-requesting information, which is used for requesting authentication of the payment subject information, to the user device, in response to the payment-reception request information at a step S630.

Next, the method for providing the payment gateway service in accordance with the third example embodiment of the present disclosure may further include steps as follows: if the payment-approval request information including the 2-nd push token ID, consented by the user at a step S635, is acquired in response to the authentication-requesting information at a step S640, and if the 1-st push token ID included in the authentication-requesting information is determined as corresponding to the 2-nd push token ID, the payment gateway server manages the 1-st push token ID or the 2-nd push token ID as the integrated push token ID, and verifies the validity of the payment-approval request information at a step S645.

Similarly to the aforementioned first example embodiment and the second example embodiment, the payment-approval according to the payment-approval request information may be one of, for example, the random-nonce using type and the time-stamp using type.

In the random-nonce using type, at the step S630, the payment gateway server may transmit the payment subject information and the authentication-requesting information including a random nonce to the user device, and the payment-approval request information may include the 2-nd push token ID, the public key of the user, and a signature value of the random nonce generated by signing the random nonce with the private key of the user, and at the step S645, the payment gateway server may verify the validity of the payment-approval request information by using the public key of the user and the signature value of the random nonce. The verification process of the validity of the signature value of the random nonce is the same as the aforementioned.

Meanwhile, in the time-stamp using type, the payment-approval request information may include the 2-nd push token ID, the public key of the user, and a time-stamp signature value generated by signing a time-stamp with the private key of the user, and at the step S645, the payment gateway server may verify the validity of the payment-approval request information by using the public key of the user and the time-stamp signature value, and if a time interval between a 1-st point of time corresponding to the time-stamp signature value and a 2-nd point of time when the validity of the payment-approval request information is verified is equal to or greater than a preset value, the payment gateway server may determine that the payment-approval request information is invalid.

Figure 7:
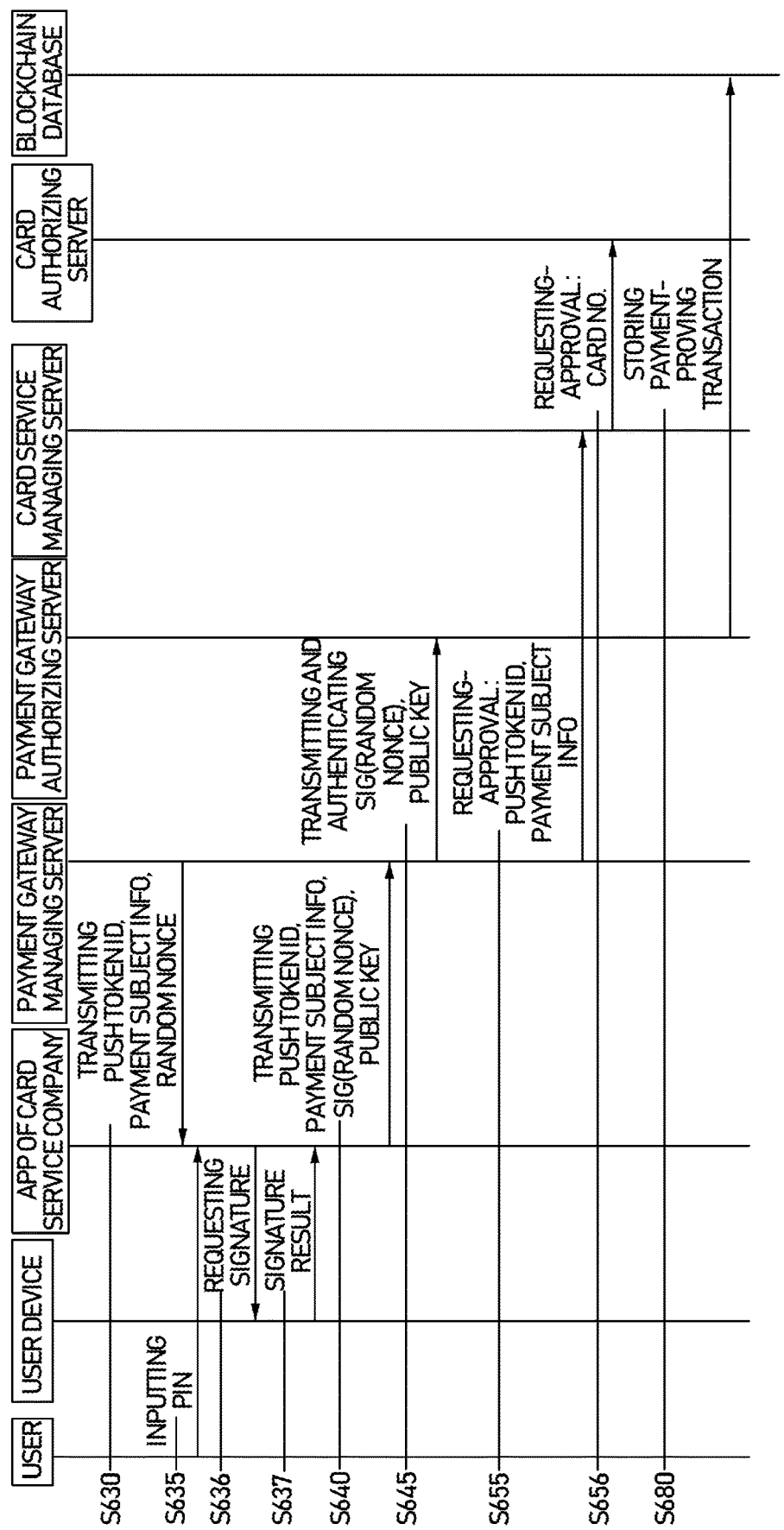
FIG. 7 is a sequence diagram schematically illustrating more detailed description of specific steps of a method illustrated in FIG. 6.

Next, by referring to FIG. 6 and FIG. 7 which shows more detailed description of specific steps in FIG. 6, the method for providing the payment gateway service in accordance with the third example embodiment of the present disclosure may further include a step as follows: if the payment-approval request information is determined as valid, the payment gateway server, shown in FIG. 7 as including the payment gateway managing server and the payment gateway authorizing server, allows the card service providing server, shown in FIG. 7 as including the card service managing server and the card authorizing server, to approve the payment according to the payment-approval request information at a step S655.

By referring to FIG. 6 again, the payment gateway server may transmit the payment-approval result acquired from the card service providing server, in response to the payment-approval request information acquired according to the user's approval, to at least one of the sales service providing server and the user device.

Also, by referring to FIG. 6, the method for providing the payment gateway service in accordance with the third example embodiment of the present disclosure may further include a step as follows: the payment gateway server stores or supports another device to store a transaction or its processed value including at least part of the hash value of the device identification information, the integrated push token ID, and the payment subject information in the database as the payment-proving transaction, at a step S680.

By referring to FIG. 7 again, in case that the payment gateway server is configured as including the payment gateway managing server and the payment gateway authorizing server, and that the authentication-requesting information includes a random nonce, then at the step S630, the payment gateway managing server may transmit the 1-st push token ID, the payment subject information, and the authentication-requesting information to the user device in response to the payment-reception request information, and if the payment-approval request information, including a signature value of the random nonce generated by signing, consented by the user at the step S635 in response to the authentication-requesting information, the random nonce with the private key of the user, the 2-nd push token ID, and the public key of the user at steps S636 and S637, is acquired from the user device at a step S640, then the payment gateway managing server may transmit the signature value of the random nonce and the public key of the user to the payment gateway authorizing server at a step S645, to thereby allow the payment gateway authorizing server to verify the validity of the payment-approval request information. And if the payment-approval request information is determined as valid, the payment gateway managing server may transmit the payment-approval request information to the card service providing server at a step S655, to thereby allow the card service providing server to approve the payment at a step S656 by using the card information for approving the payment in response to the payment-approval request information.

By referring to FIG. 6 again, the method for providing the payment gateway service in accordance with the third example embodiment of the present disclosure may further include a step as follows: if the payment has been approved, the payment gateway server transmits the payment-approval result representing that the payment has been approved to at least one of the user device and the sales service providing server.

To describe again the method for providing the payment gateway service from a perspective of the card service providing server in accordance with the third example embodiment of the present disclosure, as aforementioned, the method for providing the payment gateway service may include a step of the card service providing server acquiring the payment-approval request information from the payment gateway server, on condition (i) that the payment subject information, the sales service provider authentication information, and a hash value of the device identification information which is generated by applying the hashing operation to the device identification information to be used for identifying the user device have been acquired as the payment-reception request information, from the sales service providing server which is a server of the sales service provider, by the payment gateway server in response to the approval request from the user, (ii) that the payment subject information and the authentication-requesting information to be used for authentication of the payment subject information have been transmitted to the user device by the payment gateway server, and (iii) that the payment-approval request information transmitted to the payment gateway server consented by the user in response to the authentication-requesting information has been determined as valid, and a step of the card service providing server approving the payment by using the card information for approving the payment according to the acquired payment-approval request information.

Fourth Example Embodiment

Lastly, the fourth example embodiment of the method for providing the payment gateway service in accordance with the present disclosure is disclosed. Below, the technological characteristics identical to those of the aforementioned third example embodiment will be omitted, and only specific details will be disclosed. The fourth example embodiment includes every technical characteristic, e.g., a technical characteristic of using a Merkle tree, of the third example embodiment, and further includes the technical characteristic of calculating a representative hash value utilizing a neighboring hash value as in the second example embodiment.

Specifically, by referring to FIG. 5 again, the method for registering the certificate to be used for providing the payment gateway service in accordance with the fourth example embodiment of the present disclosure may further include a step, not illustrated, of the payment gateway server, if the anchoring condition is satisfied after the step in the third example embodiment, storing or supporting another device to store a representative hash value or its processed value in the 2-nd database, and acquiring a transaction ID representing a location of the representative hash value or its processed value in the 2-nd database, where the representative hash value or its processed value is generated by the hashing calculation using both a specific hash value, which is a hash value of the registering transaction, and its corresponding at least one neighboring hash value which is (i) a hash value of the specific registering transaction which is the specific registration information or its processed value including the specific push token ID and the public key of the specific user, or (ii) a hash value of the specific payment-proving transaction which is transaction information or its processed value including at least part of the specific hash value of the device identification information, the specific push token ID, and the specific payment subject information.

The process of storing the representative hash value or its processed value in the 2-nd database is omitted, since only difference from the second example embodiment is that the payment gateway server performs the processes, not the card service providing server.

Specifically, by referring to FIG. 6 again, the method for providing the payment gateway service in accordance with the fourth example embodiment of the present disclosure may further include a step of the payment gateway server, if the anchoring condition is satisfied after the step in the third example embodiment, storing or supporting another device to store a representative hash value or its processed value in the 2-nd database, and acquiring a transaction ID representing a location of the representative hash value or its processed value in the 2-nd database, where the representative hash value or its processed value is generated by the hashing calculation using both a specific hash value, which is a hash value of the payment-proving transaction, and its corresponding at least one neighboring hash value which is (i) a hash value of the specific registering transaction which is the specific registration information or its processed value including the specific push token ID and the public key of the specific user, or (ii) a hash value of the specific payment-proving transaction which is transaction information or its processed value including at least part of the specific hash value of the device identification information, the specific push token ID, and the specific payment subject information.

The present disclosure has an effect of providing the payment gateway service of a credit card using a lower-cost technique with stronger security and more effective usability, and of improving reliability and security of a credit card payment system by completely blocking illegal copying or forgery, in all of the aforementioned embodiments of the present disclosure.

Advantages of the technique disclosed herein with the above embodiments are guarantees of reliability of the payment system by essentially blocking forgery of payment information, i.e., public keys, hash values, minimizing possibility of leakage of the credit card information during flow of the payment, and improving integrity to prevent errors and allowing easy management of information related to the credit card payment by storing transactions in the blockchain.

The present disclosure has another effect of minimizing the possibility of leakage of the credit card information during the flow of the payment. Specifically, in accordance with the present disclosure, the payment gateway company who operates the payment gateway server does not need to store credit card numbers for the payment.

Also, the present disclosure allows the easy management of information on the card payment and improves the integrity to prevent errors by storing the certificates and transactions related to payment proof in the database, to thereby improve reliability and security of the credit card payment system.

For this purpose, the present disclosure guarantees security and prevents forgery by forcing every entity participating in the card payment to use cryptography such as hashing functions, asymmetric cryptography, e.g., RSA and ECC, which is cryptographically effective.

The present disclosure has still another effect of eliminating need of complex payment systems like simple payment, general payment, password-protected payment for the service providers like an online shopping mall, since complex processes of using conventional payment gateway companies and VAN companies are eliminated.

The present disclosure has still yet another effect of improving the reliability and the security of the credit card payment system by recording the transactions in the blockchain to prevent forgery of trade information.

Based on the explanation of the above embodiments, those skilled in the art can clearly understand that the present disclosure may be implemented by combination of software and hardware or hardware alone. The part contributing to the prior art or the object of a technical solution of the present disclosure may be implemented in a form of executable program command through a variety of computer components and may be recorded in computer readable media. The computer readable media may include solely or in combination, program commands, data files, and data structures. The program commands recorded to the media may be components specially designed for the present disclosure or may be known and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for registering an authentication certificate for a payment gateway service, comprising:

receiving from a user device, by a payment gateway server, identity authentication information and a unique 1-st push token ID, wherein the unique 1-st push token ID is associated with a push service to the user device;

transmitting, by the payment gateway server, the identity authentication information and the 1-st push token ID to a card service providing server;

receiving, by the payment gateway server, an authentication result from the card service providing server;

transmitting, by the payment gateway server, the authentication result to the user device;

receiving, at the user device, biometric information input into the user device;

in response to receiving the biometric information at the user device, generating, by the user device, a public/private key pair for the user, wherein the public/private key pair for the user corresponds to the biometric information;

receiving from the user device, by the payment gateway server (i) a public key of the public/private key pair for the user of the user device and (ii) a 2-nd push token ID corresponding to the 1-st push token ID;

storing in a private blockchain database, by the payment gateway server, registration information including an identifier of a push token and the public key, wherein the identifier of a push token is one of the 1-st push token ID or the 2-nd push token ID;

determining whether an anchoring condition is satisfied, wherein the anchoring condition is one of (i) acquiring a certain number of a specific hash value and a neighboring hash value, (ii) determining whether a certain amount of time has elapsed, (iii) generating a block in the private blockchain database, and (iv) a condition including one or more characteristics of services;

in response to the anchoring condition being satisfied, generating, by a card service providing server, from transactions stored in the private blockchain database, a representative hash value, where the representative hash value is generated by a hashing calculation using both (i) a specific hash value which is a hash value of the registration information and (ii) its corresponding at least one neighboring hash value which is one of (ii-1) a hash value of a specific registering transaction which is specific registration information including a specific push token ID and a public key of a specific user and (ii-2) a hash value of a specific payment-proving transaction which is transaction information including at least part of a specific hash value of a device identification information, the specific push token ID, and specific payment subject information;

storing in a public blockchain database, by the card service providing server, the representative hash value generated from transactions stored in the private blockchain database;

verifying, by the card service providing server, an integrity of the private blockchain database, wherein the verification includes comparing (i) the representative hash value and (ii) the corresponding representative hash value stored in the public blockchain database by the card service providing server.

2. The method of claim 1, further comprising: transmitting to the user device, by the payment gateway server, a completion of registration of a certificate message.

3. The method of claim 1, wherein the identity authentication information includes at least one of a name of the user, a phone number of the user, a number of a credit card of the user, and a CVC (Card Verification Value) of the credit card of the user.

* * * * *